United States Patent
Krueger et al.

(10) Patent No.: US 8,731,756 B2
(45) Date of Patent: May 20, 2014

(54) METHOD FOR MONITORING THE OPERATION OF A VACUUM PUMP IN A BRAKE SYSTEM

(75) Inventors: Hartmut Krueger, Buehl (DE); Karl Weidinger, Baden-Baden (DE); Peter Damm, Hagenau (FR)

(73) Assignee: Robert Bosch GmbH, Stuttgart (DE)

( * ) Notice: Subject to any disclaimer, the term of this patent is extended or adjusted under 35 U.S.C. 154(b) by 12 days.

(21) Appl. No.: 13/501,946

(22) PCT Filed: Oct. 11, 2010

(86) PCT No.: PCT/EP2010/065169
§ 371 (c)(1),
(2), (4) Date: Jun. 22, 2012

(87) PCT Pub. No.: WO2011/054623
PCT Pub. Date: May 12, 2011

(65) Prior Publication Data
US 2012/0253574 A1 Oct. 4, 2012

(30) Foreign Application Priority Data
Oct. 26, 2009 (DE) .................. 10 2009 046 006

(51) Int. Cl.
*G06F 11/30* (2006.01)
*B60T 7/12* (2006.01)
*G06F 19/00* (2011.01)

(52) U.S. Cl.
USPC .......... 701/22; 701/33.9; 701/34.1; 701/33.4; 701/7; 180/65.285; 180/65.21

(58) Field of Classification Search
USPC ........ 701/22, 33.9, 34.1, 33.4, 7; 180/65.285, 180/65.21
See application file for complete search history.

(56) References Cited

U.S. PATENT DOCUMENTS

| | | | |
|---|---|---|---|
| 4,738,112 A | 4/1988 | Nomura et al. | |
| 5,658,131 A | 8/1997 | Aoki et al. | |
| 2003/0006891 A1 | 1/2003 | Wild et al. | |
| 2008/0210497 A1* | 9/2008 | Jeon ............................ | 188/72.1 |
| 2010/0168978 A1* | 7/2010 | Schubert et al. ................ | 701/76 |

FOREIGN PATENT DOCUMENTS

| | | |
|---|---|---|
| DE | 199 29 880 | 1/2001 |
| DE | 19929880 A1 * | 1/2001 |
| WO | WO 93/11983 | 6/1993 |
| WO | WO 02/14132 | 2/2002 |
| WO | WO 0214132 A1 * | 2/2002 |

OTHER PUBLICATIONS

International Search Report for PCT/EP2010/065169, dated Oct. 11, 2010.

* cited by examiner

*Primary Examiner* — Mary Cheung
*Assistant Examiner* — Brian P Sweeney
(74) *Attorney, Agent, or Firm* — Kenyon & Kenyon LLP

(57) ABSTRACT

In a method for monitoring the operation of a vacuum pump in a brake system, the vacuum pump is operated between an activation pressure and a deactivation pressure to generate a vacuum, the evacuation period between the activation pressure and the deactivation pressure being measured and compared with a reference period. An error signal is generated if the evacuation period exceeds the reference period.

14 Claims, 1 Drawing Sheet

METHOD FOR MONITORING THE OPERATION OF A VACUUM PUMP IN A BRAKE SYSTEM

BACKGROUND OF THE INVENTION

1. Field of the Invention

The present invention relates to a method for monitoring the operation of a vacuum pump in a brake system.

2. Description of Related Art

Electric vacuum pumps are used in brake systems having pneumatic brake boosters for generating a vacuum in a chamber of the brake booster. The difference pressure between the chamber to which a vacuum is applied and a second chamber in the brake booster which is under ambient pressure is used for brake force support. Brake boosters of this type, which have an additional vacuum pump, are used, in particular, in vehicles having diesel engines as well as in commercial vehicles.

To maintain the brake boosting action over longer periods of operation, the operability of the vacuum pump is decisive. Due to the limited life cycle of electric vacuum pumps, the pump performance changes as a result of wear as mileage increases, which causes the brake boosting action to deteriorate.

BRIEF SUMMARY OF THE INVENTION

An object of the present invention is to monitor the operation of a vacuum pump which is used to produce a vacuum in a brake booster of a brake system.

The method according to the present invention for monitoring the operation of an electric vacuum pump is used in brake systems of vehicles which have a pneumatic brake booster, a vacuum being generated on the vacuum side of the brake booster by operating the vacuum pump. During operation, the vacuum pump is operated between an activation pressure, which represents a first pressure threshold, and a deactivation pressure, which designates a second pressure threshold. These pressure thresholds identify an evacuation period in which the medium in the vacuum chamber of the brake booster is evacuated, thereby generating a vacuum.

To monitor the operation of the vacuum pump, the evacuation period between the activation pressure and the deactivation pressure is determined and compared with a reference period, an error signal being generated in the event that the evacuation period exceeds the reference period. The reference period represents a comparison quantity which is determined, in particular, as a function of instantaneous surroundings and/or vehicle conditions and is thus not necessarily present as a fixed quantity but preferably as a variable quantity. In principle, however, a fixed, invariable value is also possible for the reference period. The operability of the electric vacuum pump may be reliably inferred from the comparison between the evacuation period actually needed, which is required to reduce the pressure from the higher activation pressure to the lower deactivation pressure, and the reference period. If the evacuation period exceeds the reference period, an impairment of the operation of the vacuum pump must be assumed, after which an error signal is generated which is further processed in an advantageous manner. However, if the evacuation period lies within the reference period, an adequate operability of the electric vacuum pump may be assumed.

This procedure has the advantage that the comparison between the evacuation period and the reference period provides an easily managed criterion which may be reliably used to assess the operability. The operation may be monitored during operation, during which the electric vacuum pump is operated for providing the desired vacuum in the brake booster; however, it is not necessary, in principle, to start up the vacuum pump in addition to the regular operation thereof. It is also advantageous that the reference period may be flexibly defined in such a way that different instantaneous status and surroundings variables may be taken into account.

According to an advantageous embodiment, the reference period used for comparison with the evacuation period is determined as a function of the supply voltage which is applied to the electric vacuum pump. The supply voltage originates from the vehicle's on-board electrical system, into which the brake system is integrated, and it may be subject to fluctuations which are attributable, for example, to the simultaneous operation of multiple power-intensive consumers within the vehicle. Due to the fluctuations in the supply voltage, a longer or shorter evacuation period may be required for generating a desired vacuum even if the vacuum pump is fully operational, which is taken into account by the reference period to be adjusted to the supply voltage.

Furthermore, it is possible to determine the reference period as a function of either the temperature of a component in the brake system, in particular the vacuum pump, and/or the ambient temperature. The temperature may also influence the evacuation characteristic of the vacuum pump.

In addition or as an alternative, the atmospheric or ambient pressure may also be taken into account for determining the reference period for the purpose of improving the quality of monitoring the operation of the vacuum pump. A change in the ambient pressure also influences the evacuation performance of the pump. Since the vacuum in the brake booster is usually ascertained with the aid of a difference pressure sensor, which does not permit a statement to be made about the absolute ambient pressure, the ambient pressure is advantageously determined with the aid of an additional sensor signal, in particular from an absolute pressure sensor. The absolute pressure sensor does not have to be part of the brake system; in principle, it is sufficient if the information from a pressure sensor located in the vehicle is supplied via the usual data channels to a regulating or control unit in which the method for monitoring the operation of the vacuum pump is carried out.

The reference period is advantageously determined from a reference characteristic map in which the pressure curve of the vacuum producible by the vacuum pump is representable as a function of the supply voltage of the vacuum pump as well as time. In principle, however, a corresponding functional relationship is also possible. The dependency of the reference period on temperature and/or ambient pressure is preferably taken into account by correction terms, which are used to adjust the reference period which is determined in the reference characteristic map or in the functional relationship.

The ascertainment of the evacuation period is advantageously carried out only if the brake pedal is not operated to rule out another dependency of the pressure characteristic map on a reduction in the volume to be evacuated while operating the brake pedal. The time measurement between the two pressure points or pressure thresholds advantageously rather takes place only after a brake pedal operation is no longer present. According to an alternative embodiment, however, the evacuation period may also be determined during a brake pedal operation. In this case, the pressure curve is advantageously determined as a function of the reducing volume in the vacuum chamber of the brake booster, for example with the aid of a correction term.

Whether the brake pedal is presently being operated is determined, for example, with the aid of a signal of a brake light switch in the vehicle which is coupled with the operation of the brake pedal. The operation of the brake pedal may be inferred by evaluating the signal of the brake light switch.

The pressure thresholds, i.e., the activation pressure and/or the deactivation pressure, which delimit the evacuation period, may be determined either as fixed limits or as values which are dependent on the instantaneous status. In the latter case, the activation pressure and/or the deactivation pressure is/are determined as a function of an instantaneous vehicle status and/or the surroundings conditions, such as the ambient temperature and ambient pressure. All vehicle status variables as well as vehicle parameters of various units within the vehicle, in particular those of the brake system, may be considered as the instantaneous operating state.

If a malfunction of the vacuum pump is determined during inspection and an error signal is consequently generated, the error signal may be further processed in different ways. For example, it is possible to store the error signal in a storage unit without having to take any additional measures. This procedure is useful, in particular, when relatively small power losses occur in the vacuum pump which are reflected only by a slightly longer evacuation period. The error signal may be read from the storage unit, in particular during maintenance work. If multiple error signals are present, additional measures may be taken as needed.

It is furthermore possible to output the error signal in the form of a warning signal to the driver for the purpose of alerting the driver to the malfunction.

Finally, it is also possible to take additional safety measures in the presence of an error signal to at least partially compensate for the power loss in the vacuum pump and the lower vacuum associated therewith. In the event of an error signal, for example, a hydraulic brake system in the vehicle is activated to compensate, via the hydraulic braking process, for a reduced braking torque which is based on the reduced brake force support as a result of the power loss in the vacuum pump.

In a hybrid vehicle, which has an internal combustion engine as well as at least one electric motor as drive units, it may be advantageous to deactivate an exclusively electric mode of operation for the duration of the malfunction to maintain continuous operation of the internal combustion engine and to be able to use the internal combustion engine as a vacuum source for evacuating the brake booster.

According to another aspect of the present invention, the pressure signal of the brake booster is evaluated when the brake pedal is not being operated and when the vacuum pump is not running, a pressure loss in the pressure signal indicating a leak in the system, in particular in the vacuum pump.

The method for monitoring the operation of the vacuum pump runs in a regulating or control unit which is, in particular, part of a brake system in a vehicle.

DETAILED DESCRIPTION OF THE INVENTION

Figure 1:
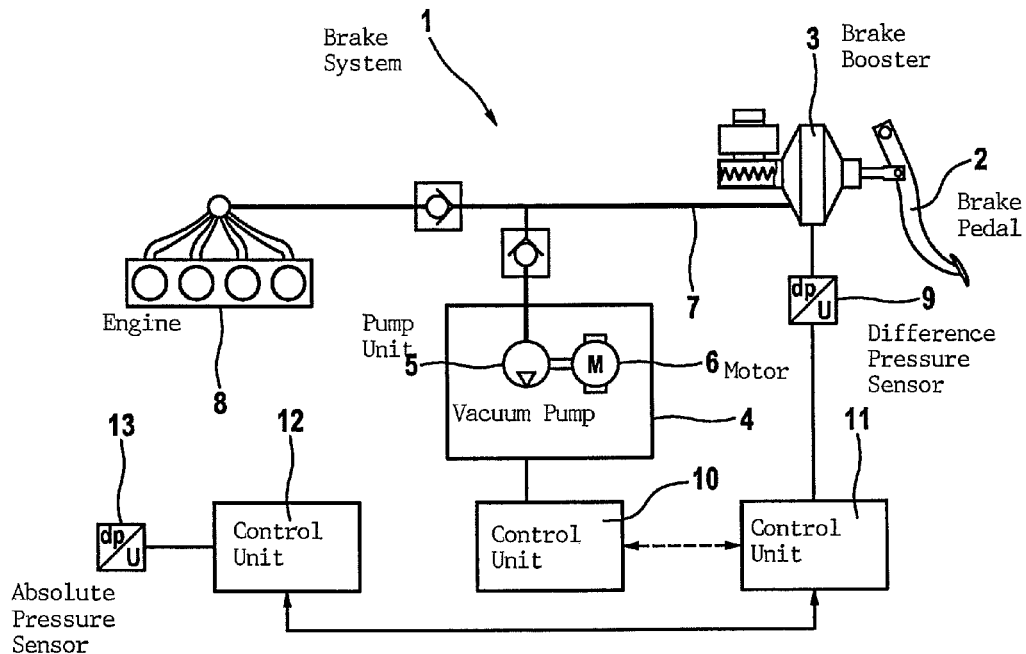
FIG. 1 shows a schematic representation of a brake system in a vehicle, including a pneumatic brake booster to which an electric vacuum pump is assigned.

FIG. 1 shows a brake system 1 which is integrated into a vehicle, brake system 1 being activated via a brake pedal 2 which is coupled with a pneumatic brake booster 3. An electric vacuum pump 4, which has a pump unit 5 and an electric motor 6 for driving pump unit 5, is assigned to pneumatic brake booster 3. Vacuum pump 4 is connected to the vacuum chamber of brake booster 3 via a pressure line 7. The vacuum chamber of brake booster 3 is evacuated during operation of vacuum pump 4, which achieves a brake boosting action to assist the braking process.

FIG. 1 shows an internal combustion engine 8, which is used as the drive unit of the vehicle and whose intake tract is connected to pressure line 7 via an additional line and thus also to the vacuum chamber of brake booster 3. The pressure reduction in the vacuum chamber of brake booster 3 may be at least partially produced with the aid of internal combustion engine 8 via this connection. A minimum vacuum in brake booster 3 is ensured in this manner, in particular in the event of a failure or reduced performance of vacuum pump 4.

The pressure in the vacuum chamber of the brake booster is determined with the aid of a difference pressure sensor 9 which indicates the difference pressure between the vacuum chamber and an additional chamber in brake booster 3, to which atmospheric pressure or ambient pressure $p_{atm}$, in particular, is applied.

A regulating or control unit 10 is assigned to vacuum pump 4, in which control signals for vacuum pump 4 are generated, on the one hand, and in which monitoring of the operation of the vacuum pump is carried out, on the other hand. Regulating or control unit 10 is connected to additional regulating or control units 11 and 12 either directly or via a data channel in the vehicle, in particular a CAN bus, unit 11 being an ESP (electronic stability program) control unit and unit 12 being an engine control unit. An absolute pressure sensor 13, which may be used to determine absolute ambient pressure $p_{atm}$, is assigned to engine control unit 12. Via the data channel, absolute pressure $p_{atm}$ is also available to regulating or control unit 10, which is assigned to vacuum pump 4.

Figure 2:
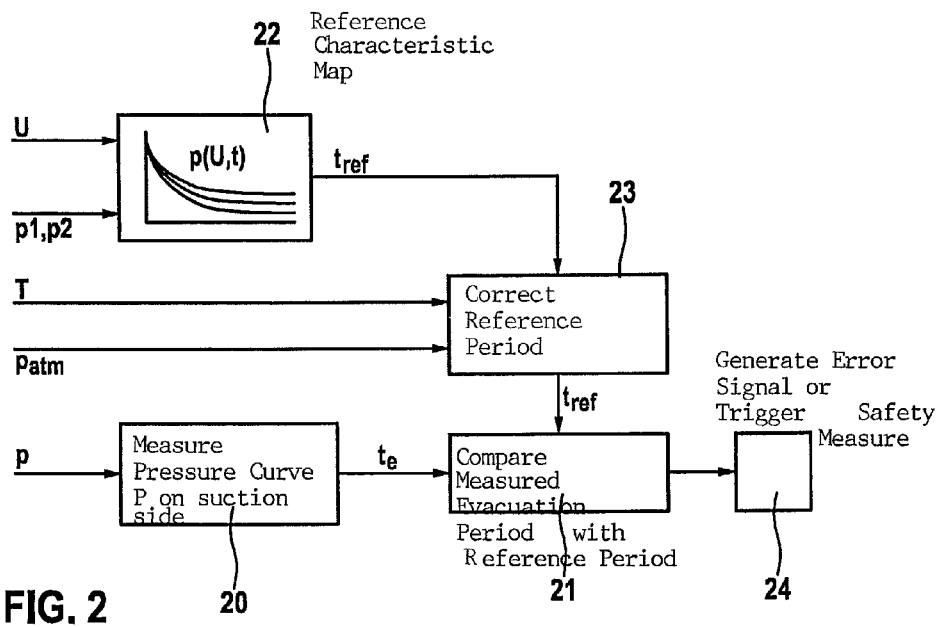
FIG. 2 shows a block diagram for carrying out the method for monitoring the operation of the vacuum pump.

The block diagram according to FIG. 2 shows the method sequence for monitoring the operation of the vacuum pump. Pressure curve p on the suction side of the vacuum pump is measured in a block 20, pressure p corresponding to the vacuum in the vacuum chamber of brake booster 3. Pressure curve p is measured with the aid of difference pressure sensor 9, the measurement being carried out between two pressure threshold values, namely a higher activation pressure $p_1$ and a lower deactivation pressure $p_2$. The period required to evacuate the vacuum chamber from activation pressure $p_1$ to deactivation pressure $p_2$ is designated as evacuation period $t_e$.

In subsequent block 21, measured evacuation period $t_e$ between pressure threshold values $p_1$ and $P_2$ is compared with a reference period $t_{ref}$, which originates from a block 22 which includes a reference characteristic map p(U,t). The reference characteristic map is the pressure reference characteristic map, which is dependent on supply voltage U and time t.

Instantaneous supply voltage U, which is available to the vacuum pump from the vehicle's on-board electrical system, and pressure threshold values $p_1$ and $p_2$ are supplied to block 22 as input variables. These input variables may be used to determine a reference period $t_{ref}$ in the reference characteristic map. This reference period $t_{ref}$ is supplied as the input variable to an additional, intermediate block 23, which has temperature T and ambient pressure $p_{atm}$ as additional input variables. Temperature T is temperature $T_v$ of the vacuum pump and, if necessary, also ambient temperature $T_{atm}$. Like ambient pressure $p_{atm}$, both temperature values may be used in block 23 to correct reference period $t_{ref}$ so that a corrected reference period $t_{ref}$ is present at block 23 as an output variable, the corrected reference period being available as an input variable and comparison variable in block 21 for comparison with measured evacuation period $t_e$.

If the comparison in block 21 shows that evacuation period $t_e$ exceeds reference period $t_{ref}$, the inoperability or at least a limited functionality of the vacuum pump must be assumed. In this case, an error signal is generated in a subsequent block 24 which is either stored in a storage unit, displayed to the driver or used to trigger safety measures. For example, an automatic hydraulic braking action, which has an assisting effect, is triggered as the safety measure. In a hybrid drive, which includes both the internal combustion engine and at least one electric motor as the drive unit, it is possible to suppress a purely electric mode of operation to ensure continuous operation of the internal combustion engine and thus to ensure that a vacuum is applied to the vacuum chamber of the brake booster.

What is claimed is:

1. A method for operating a vacuum pump in a brake system of a vehicle, comprising:
    operating the vacuum pump between a start time at which the vacuum pump is at an activation pressure and an end time at which the vacuum pump is at a deactivation pressure to generate a vacuum;
    determining, by a control unit, an evacuation period between the start time corresponding to the activation pressure and the end time corresponding to the deactivation pressure;
    comparing, by the control unit, the determined evacuation period with a predetermined reference maximum evacuation period; and
    generating, by the control unit, an error signal in the event the determined evacuation period exceeds the predetermined reference maximum evacuation period;
    wherein the reference maximum evacuation period is determined at least as a function of at least one of a vacuum pump temperature and an ambient temperature.

2. The method as recited in claim 1, wherein the reference period is determined as a function of a supply voltage.

3. The method as recited in claim 1, wherein the reference period is determined as a function of the ambient pressure.

4. The method as recited in claim 1, wherein the reference period is determined from a reference characteristic map.

5. The method as recited in claim 1, wherein the determination of the evacuation period is carried out only if a brake pedal is not operated.

6. The method as recited in claim 5, wherein the operation of the brake pedal is determined with the aid of a signal of a brake light switch.

7. The method as recited in claim 5, wherein the vehicle is a hybrid vehicle, and wherein an exclusively electric mode of operation is suppressed in the hybrid vehicle in the event the error signal is generated.

8. The method as recited in claim 1, wherein at least one of the activation pressure and the deactivation pressure is determined as a function of at least one of an instantaneous operating state and conditions of surroundings of the vehicle.

9. The method as recited in claim 1, wherein the error signal is stored in a storage unit.

10. The method as recited in claim 1, wherein the error signal is output as a warning signal.

11. The method as recited in claim 1, further comprising:
    providing an additional safety measure in the event the error signal is generated, wherein the safety measure includes automatic braking action.

12. The method as recited in claim 11, wherein the additional safety measure includes activating a hydraulic brake system.

13. The method as recited in claim 1, wherein a pressure in the brake system is determined when a brake pedal is not operated and the vacuum pump is not running, and wherein an error signal is generated in the event of a specified pressure reduction.

14. A control unit for operating a vacuum pump in a brake system of a vehicle, comprising:
    means for operating the vacuum pump between a start time at which the vacuum pump is at an activation pressure and an end time at which the vacuum pump is at a deactivation pressure to generate a vacuum;
    means for determining an evacuation period between the start time corresponding to the activation pressure and the end time corresponding to the deactivation pressure;
    means for comparing the determined evacuation period with a predetermined reference maximum activation period; and
    means for an error signal in the event the determined evacuation period exceeds the predetermined reference maximum activation period;
    wherein the reference maximum activation period is determined at least as a function of at least one of a vacuum pump temperature and an ambient temperature.

* * * * *